United States Patent
Maler

(10) Patent No.: US 7,336,948 B1
(45) Date of Patent: Feb. 26, 2008

(54) COMMUNICATION TERMINAL EQUIPMENT FOR WIRELESS COMMUNICATION WITH TRANSMISSION/RECEPTION BASE STATIONS OF DIFFERENT COMMUNICATION SYSTEMS

(75) Inventor: Klaus Maler, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/509,408

(22) PCT Filed: Sep. 21, 1998

(86) PCT No.: PCT/DE98/02803

§ 371 (c)(1),
(2), (4) Date: Mar. 27, 2000

(87) PCT Pub. No.: WO99/17578

PCT Pub. Date: Apr. 8, 1999

(30) Foreign Application Priority Data

Sep. 26, 1997  (DE) .............................. 197 42 580

(51) Int. Cl.
H04Q 7/20 (2006.01)
H04M 1/00 (2006.01)

(52) U.S. Cl. ................... 455/426.1; 455/552.1

(58) Field of Classification Search ........... 455/426, 455/552, 553, 550.1, 551, 552.1, 553.1, 407, 455/525, 524, 127.4, 417, 425, 437, 54.2, 455/168.1, 575, 426.1; 370/59, 60

See application file for complete search history.

(56) References Cited

U.S. PATENT DOCUMENTS

| | | | |
|---|---|---|---|
| 5,506,887 A | | 4/1996 | Emery et al. |
| 5,590,174 A | | 12/1996 | Tsuji et al. |
| 5,754,542 A | * | 5/1998 | Ault et al. ................. 370/342 |
| 5,864,764 A | * | 1/1999 | Thro et al. ................. 455/561 |
| 5,870,674 A | * | 2/1999 | English .................... 455/432 |
| 5,995,828 A | * | 11/1999 | Nishida .................... 455/417 |
| 6,151,492 A | * | 11/2000 | Melin ....................... 455/414 |
| 6,442,616 B1 | * | 8/2002 | Inoue et al. ............... 709/245 |
| 6,735,432 B1 | * | 5/2004 | Jarett et al. ............... 455/417 |

FOREIGN PATENT DOCUMENTS

| | | |
|---|---|---|
| DE | 43 43 335 | 6/1995 |
| DE | 43 44 702 | 7/1995 |
| DE | 196 43 186 | 4/1998 |
| EP | 0 738 093 | 10/1996 |
| GB | 2 282 731 | 4/1995 |
| WO | WO 97/21315 | 6/1997 |

* cited by examiner

Primary Examiner—Naghmeh Mehrpour
(74) Attorney, Agent, or Firm—Bell, Boyd & Lloyd LLP

(57) ABSTRACT

The communication terminal apparatus is logged on as ready to receive a selected base station of one of a number of communication systems. The communication terminal apparatus recognizes one of the at least two communication systems having the selected base station. The apparatus also allocates a network address to the recognized communication system under which the communication terminal apparatus can currently be reached and communicates the network address to a control network address. The control network address is stored in a memory.

6 Claims, 1 Drawing Sheet

COMMUNICATION TERMINAL EQUIPMENT FOR WIRELESS COMMUNICATION WITH TRANSMISSION/RECEPTION BASE STATIONS OF DIFFERENT COMMUNICATION SYSTEMS

BACKGROUND OF THE INVENTION

1. Field of the Invention

The invention is directed to communication terminal equipment for wireless communication with transmission/reception base stations of communication systems. In particular, the invention relates to a communication terminal that recognizes a communication system having a selected base station and allocates a network address to the recognized communication system.

2. Description of Related Art

Such communication terminal equipment are known and work according to cordless communication standards such as DECT or mobile radio telephone standards such as GSM, DCS-1800 or CDMA standards. In addition to communication terminal equipment that communicate on a radio basis, there are also communication terminal equipment that communicate on the basis of infrared transmission. A communication system for a communication terminal equipment working according to the DECT standard is, for example, an individual transmission/reception base station operated as subscriber means at a public communication network having call control or a communication private branch exchange system having a plurality of transmission/reception base stations and an exchange means. Such communication terminal equipment according to the DECT standard can usually be logged on and operated at a plurality of such communication systems with respective access authorization. Communication terminal equipment that work according to one of the aforementioned mobile radio telephone standards are usually operated at mobile radio telephone networks. A communication system according to the aforementioned definition for mobile radio telephone terminal devices is such a mobile radio telephone network.

There are also communication terminal equipment for mobile radio telephone operation that can either be operated at two mobile radio telephone networks working according to different standards or in an operating mode as cordless terminal equipment according to a cordless standard and that can be operated in another operating mode as mobile radio telephone terminal equipment according to a mobile radio telephone standard. Such communication terminal equipment are usually referred to as mobile dual-mode communication terminal equipment.

When communication terminal equipment working according to one of the aforementioned principles is operated as subscriber equipment at a plurality of communication systems, then it can often be reached via different network addresses (telephone numbers) in these communication systems. A connection setup attempt addressed to one of these network addresses is unsuccessful because the communication terminal equipment is not logged on as reachable at a transmission/reception base station of the allocated communication system and the communication system at whose transmission/reception base station of the allocated communication system it is logged on as reachable has not communicated to any information the location of this communication terminal equipment to the communication system wherein the communication terminal equipment can be reached under this network address.

European Document No 0 738 093 A2, U.S. Pat. No. 5,506,887 and World Patent Document No. 97/21315 disclose a communication terminal equipment for wireless communication with one of at least two transmission/reception base stations of at least two communication systems in whose transmission/reception area the communication terminal equipment is located and at which it is logged on as currently ready to receive. The communication terminal equipment recognizes the communication system to which the transmission/reception station at which the communication terminal equipment is logged on as currently ready to receive belongs.

German Patent Document No. 43 43 335 A1 discloses a method for reaching telephone subscribers in fixed and mobile telephone networks upon employment of a mobile radiotelephone. Upon initial installation of the mobile radiotelephone, the local code or number of a fixed connection of the fixed telephone network and the direct-dial identifier of a telephone exchange system that is connected to a public, digitally functioning network is programmed into or stored in the program memory devices of the mobile radiotelephone. The program provided therefor is fashioned such that, dependent on where or, respectively, at which network access point the mobile radiotelephone is located at the moment, the rerouting required for the creation of the necessary connection code is implemented by manipulation of these numerals or numbers. In the "called" case, thus, a call control is provided that automatically activates a call redirection when the mobile radiotelephone is no longer located in the coverage area of a DECT network. This call redirection can also be in turn cancelled at any time when a reachability of the mobile radiotelephone is not desired.

SUMMARY OF THE INVENTION

An object of the present invention is to offer a communication terminal equipment that reduces the number of such unsuccessful call attempts.

In an embodiment, the present invention provides a communication terminal apparatus for wireless communication with a selected base station of one of at least two communication systems. The communication terminal apparatus is logged on as ready to receive the selected base station. The communication terminal apparatus includes recognition means for recognizing one of the at least two communication systems having the selected base station; and control means for allocating a network address to the recognized communication system under which the communication terminal apparatus can currently be reached and communicating the network address via the selected base station to a control network address being stored in a memory.

In another embodiment of the present invention, the control means allocates a network address to the recognized communication system under which the communication terminal apparatus can currently be reached and communicates control information via the selected base station to a control network address for influencing an activation/deactivation condition related to another communication system not having the selected base station. The control network address is stored in a memory.

In an embodiment, the control information activates a call redirection relating to a subscriber address under which the communication terminal apparatus can be reached via another communication system not having the selected base station, given corresponding readiness to receive by the communication terminal apparatus.

In an embodiment, the control means communicates a network address under which the communication terminal apparatus can be currently reached.

In an embodiment, the communication terminal apparatus includes a memory for storing a control network address of a mobility server.

In an embodiment, the memory stores a plurality of control network addresses of a plurality of communication systems.

In an embodiment, the communication terminal apparatus includes selection means for selecting at least one control network address of another communication system not having the selected base station.

A communication terminal equipment for wireless communication with one of at least two transmission/reception base stations of at least two communication systems in whose transmission/reception area the communication terminal equipment is located and at which it is logged on as being currently ready to receive has a recognition means for recognizing the communication system to which the transmission/reception base station belongs at which the communication terminal equipment has logged on as being currently ready to receive. Such a communication terminal equipment contains a control means in order to assign a network address to the recognized communication system under which the communication terminal equipment can be currently reached and in order—when the communication terminal equipment has logged on at a transmission/reception base station as currently ready to receive—to communicate the network address under which it can be currently reached via this transmission/reception base station to a control network address stored in the communication terminal equipment.

A communication terminal equipment fashioned in conformity with this aspect of the invention supplies a controller reachable via a control address with the currently valid network address, i.e. with the network address under which the communication terminal equipment and, thus, usually, the subscriber to whom this is allocated can be reached.

According to another aspect of the invention, the aforementioned object is achieved by a communication terminal equipment for wireless communication with one of at least two transmission/reception base stations of at least two communication systems in whose transmission/reception area the communication terminal equipment is located and at which it is currently logged on as ready to receive. This communication terminal equipment also has a recognition means for recognizing the communication system to which the transmission/reception base station belongs at which the communication terminal equipment is logged on as currently ready to receive. Inventively, this communication terminal equipment contains a control means in order to assign a network address to the recognized communication system under which the communication terminal equipment can be currently reached and in order—when the communication terminal equipment has logged on at the moment at a transmission/reception base station as currently ready to receive—to communicate a control information via this transmission/reception base station to a control network address stored in the communication terminal equipment for influencing the activation/deactivation status of a performance feature appertaining to the communication system to which this transmission/reception base station does not belong.

Given employment of arbitrary communication systems, such communication terminal equipment can make it possible to subject a call directed for the communication terminal equipment to a communication system via which it cannot be currently reached to a desired handling.

Such a call, for example, can be rerouted by a performance feature of call redirection to a pre-defined telephone address or to the network address under which the communication terminal equipment can be currently reached. When only two addresses are available for selection and under which the communication terminal equipment could be reached, the rerouting destination address can be pre-set. However, a network address communicated from the communication terminal equipment can also be employed as a rerouting destination address, the communication terminal equipment being currently reachable under this address. In this case, the control means could, using the control information, also communicate the network address under which the communication terminal equipment can be currently reached.

For example, the address of a voice mail function, of an announcement service, of a mobility server or of the terminal equipment of an agent could be pre-defined rerouting destination addresses according to an embodiment.

When the control means in an embodiment of such a communication terminal equipment communicates a control information for activation of the performance feature of call redirection with respect to a subscriber address under which the communication terminal equipment would be reachable via a different communication system given corresponding readiness to receive, then this control information can, for example, be directed to a control address of this communication system via which the communication terminal equipment cannot be reached at the moment in order to influence a performance feature control of this communication system. When the communication system via which the communication terminal equipment can be currently reached and the communication system via which the communication terminal equipment cannot be reached at the moment can both be reached via a communication network such as, for example, an ISDN network, that offers a performance feature control for call redirection controllable by the terminal equipment, the control means can communicate the control information to this performance feature control as well. Over and above this, the delivery of incoming calls can also be undertaken by a mobility server that respectively knows the current location of the terminal equipment. In this case, the network address under which the terminal equipment is currently reachable or the control information would be communicated to such a mobility server. Such a mobility server can be connected both to one of the communication systems as well as to a communication network.

A beneficial development of an inventive communication terminal equipment accordingly contains a memory for storing a control network address of a mobility server.

A further development of an inventive communication terminal equipment contains a memory for storing control network addresses of a plurality of communication systems and a selection means for selecting at least one control network address of a communication system to which the transmission/reception base station at which the communication terminal equipment has currently logged on as ready to receive does not belong.

As a result thereof, the control network addresses of all communication systems with respect whereto the communication terminal equipment undertakes initiations dependent on its current location are available in the communication terminal equipment. Potentially required updatings in the individual communication systems are not required. Each communication system only needs to know the communication terminal equipment and only this needs to be adapted to the changing situations.

The invention is explained in greater detail below with reference to the figure and on the basis of an exemplary embodiment.

BRIEF DESCRIPTION OF THE DRAWINGS

The FIG. 1 shows a schematic block diagram of an inventive communication terminal equipment with communication systems that are connected via a communication network according to the present invention.

DETAILED DESCRIPTION OF THE PRESENTLY PREFERRED EMBODIMENTS

Figure 1:
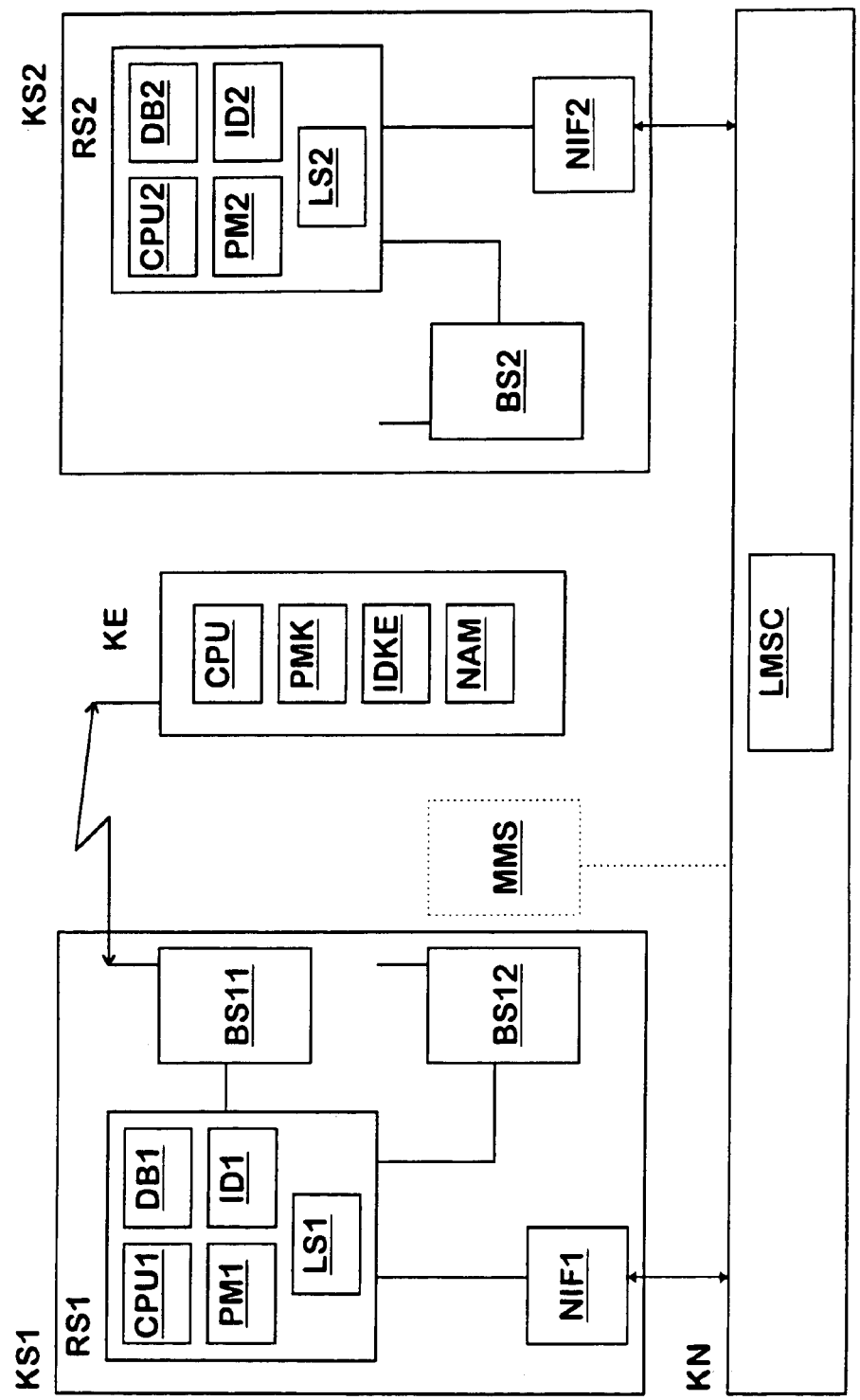

The FIG. 1 shows a communication terminal equipment KE having a control means CPU, a program memory PMK, a memory IDKE for a communication terminal equipment identifier and a memory NAM for network addresses under which the communication terminal equipment KE can be reached and also contains a control network address.

Moreover, two communication systems KS1, KS2 are shown in the FIGURE. Each of these communication systems KS1, KS2 contains a control means CPU1, CPU2, a memory for a data base DB1, DB2 for a subscriber-relevant data, a program memory PM1, PM2, a memory ID1, ID2 for a communication system identifier and a performance feature controller LS1, LS2. The performance feature controller need thereby not—as shown in the FIGURE—be contained in the call control RS1, RS2 but can also work parallel thereto. One of the communication systems KS1 contains two transmission/reception base stations BS11, BS12 in order to wirelessly communicate with the communication terminal equipment KE. A radio connection is shown in the FIGURE between the transmission/reception base station BS11 and the communication terminal equipment KE.

The communication system KS2 contains a single transmission/reception base station BS2. Both the communication system KS1 as well as the communication system KS2 are respectively coupled to a communication network KN via a network interface NIF1, NIF2 and can thus be connected to one another. The communication network KN contains a performance feature controller LMSC, which is not compulsory for the invention. A mobility management controller in the form of a mobility server MMS that is coupled to the communication network KN is also shown in the FIGURE in broken lines. This mobility management controller MMS can be optionally employed and is not compulsory for the invention. Moreover, this mobility management controller MMS can also be contained within one of the communication systems KS1, KS2 or can be connected to such a communication system.

The communication terminal equipment KE in the transmission/reception area of the transmission/reception base station BS11 of the communication system KS1 logs on at the communication system KS1 as currently reachable via this transmission/reception base station BS11. Subsequently, a recognition means realized by the control means CPU and the program memory PMK recognizes—with reference to a communication system identifier communicated from the transmission/reception base station BS11 and stored in the memory ID1 or with reference to an identifier of the transmission/reception base station BS11—the communication system KS1 to which the transmission/reception base station BS11 belongs. The control means CPU communicates the network address via which the communication terminal equipment KE can be reached via the network interface NIF1 and the communication network KN to a control network address. The network address via which the communication terminal equipment KE can be reached and the control network address are stored in the network address memory NAM.

In a first development of the exemplary embodiment, the address of the performance feature controller LMSC of the communication network KN can be provided as a control network address in order to activate the performance feature of call redirection with respect to the calls directed to the communication terminal equipment KE via the communication system KS2.

In a second development of the exemplary embodiment, the address of the performance feature controller LS2 of the communication system KS2 can be provided as a control network address in order to activate the performance feature of call redirection with respect to the calls directed to the communication terminal equipment KE via the communication system KS2.

In a third development of the exemplary embodiment, the address of the mobility server MMS can be provided as a control network address in order to deliver calls directed to the communication terminal equipment KE via the communication system KS2 to the communication terminal equipment KE via the communication system KS1.

It should be understood that various changes and modifications to the presently preferred embodiments described herein will be apparent to those skilled in the art. Such changes and modifications can be made without departing from the spirit and scope of the present invention and without diminishing its attended advantages. It is, therefore, intended that such changes and modifications be covered by the appended claims.

What is claimed is:

1. A dual-mode communication terminal apparatus for wireless communication with a selected base station of one of at least two different communication systems, the communication terminal apparatus being logged on as ready to receive from the selected base station, the communication terminal apparatus comprising:

recognition means for recognizing one of the at least two communication systems, the recognized communication system having the selected base station; and control means configured to allocate a network address to the recognized communication system under which the communication terminal apparatus can currently be reached and to communicate the network address via the selected base station to a control network address stored in a memory of the communication terminal apparatus;

wherein the network address communicated to the control network address stored in the memory is used for assisting in handling a call intended for the communication terminal apparatus but directed to a communication system via which the communication terminal apparatus cannot currently be reached.

2. A dual-mode communication terminal apparatus for wireless communication with a selected base station of one of at least two different communication systems, the communication terminal apparatus being logged on as ready to receive from the selected base station, the communication terminal apparatus comprising:

recognition means for recognizing one of the at least two communication systems, the recognized communication system having the selected base station; and control means for allocating a network address to the recognized communication system under which the communication terminal apparatus can currently be reached and communicating control information via the selected base station to a control network address stored in a memory of the communication apparatus for influencing an activation/deactivation condition related to another communication system not having the selected base station upon a call being made to the communication terminal apparatus but directed to the communication system not having the selected base station.

3. The communication terminal apparatus of claim 2, wherein the control information activates a call redirection relating to a subscriber address under which the communication terminal apparatus can be reached via another communication system not having the selected base station, given corresponding readiness to receive the another communication system by the communication terminal apparatus.

4. The communication terminal apparatus of claim 2, wherein the control means communicates a network address under which the communication terminal apparatus can be currently reached.

5. The communication terminal apparatus of claim 2, wherein the memory stores a control network address of a mobility server.

6. The communication terminal apparatus of claim 2, wherein the memory stores a plurality of control network addresses of a plurality of communication systems, and the communication terminal apparatus further comprising:

selection means for selecting at least one control network address of another communication system not having the selected base station.

* * * * *